Nov. 14, 1939.  R. E. WISSMAN  2,180,218
COMBINED CLUTCH AND BRAKE FOR PRESSES
Filed June 7, 1938
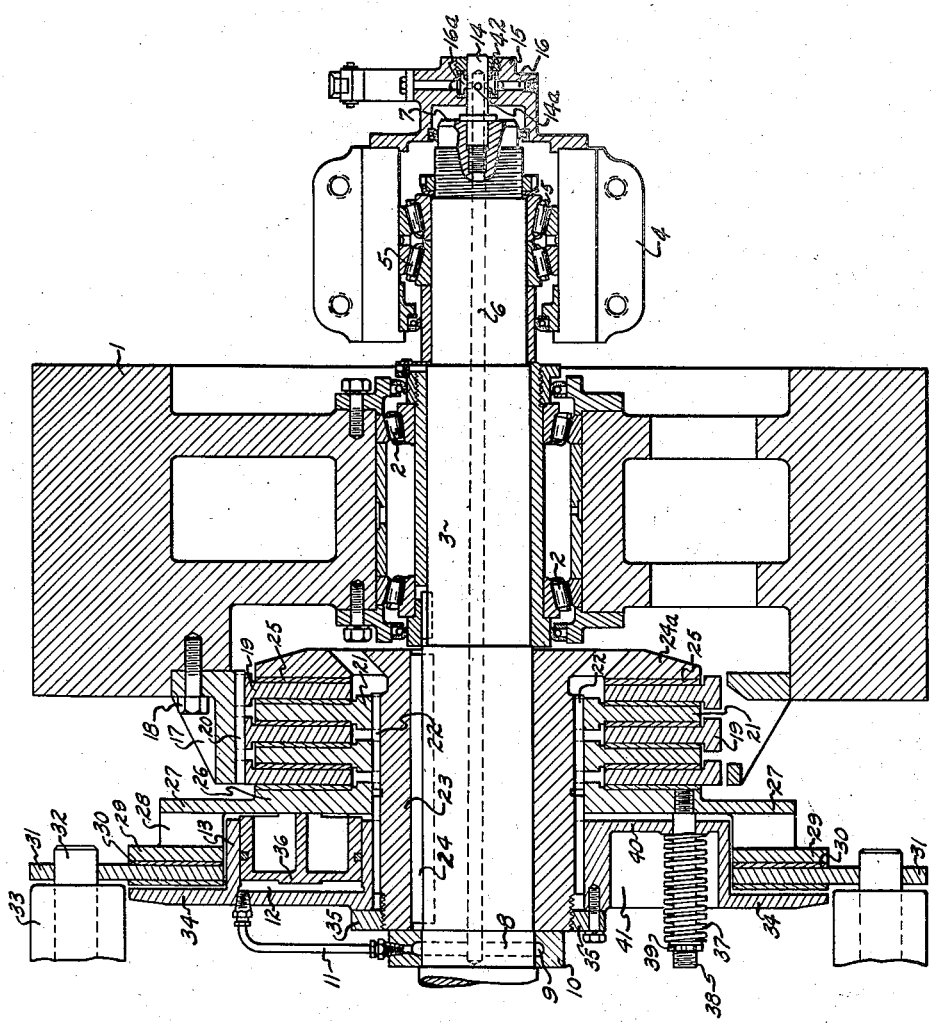
INVENTOR:
REUBEN E. WISSMAN
BY
ATTORNEYS.

Patented Nov. 14, 1939

2,180,218

UNITED STATES PATENT OFFICE 2,180,218

COMBINED CLUTCH AND BRAKE FOR PRESSES

Reuben E. Wissman, Minster, Ohio, assignor to The Minster Machine Company, Minster, Ohio, a corporation of Ohio Application June 7, 1938, Serial No. 212,321

8 Claims. (Cl. 192—18)

My invention relates to combined clutches and brakes particularly adaptable to mechanical presses.

It is the object of my invention to provide a pneumatically or hydraulically operated combined clutch and brake.

A particular object of this invention is to provide a clutch and brake of different diameters with symmetrically disposed, interiorly located pressure means to one side of the clutch and within the brake for actuating the respective clutch and brake means.

In the drawing:

The drawing shows the construction of my invention in section with the shaft in elevation having certain stationary portions of the press in elevation.

Referring to the drawing in detail, I designates a flywheel mounted upon the tapered roller bearing 2 upon the shaft 3. The shaft 3 is supported in the bearing block 4 through the tapered roller bearings 5. The shaft is provided with a passageway 6 extending from the outer end 7 to a cross passageway 8 which communicates with a groove 9 in a collar 10 that, in turn, communicates with the pipe 11 which is connected to the cylinder space 12 within a cylinder 13.

The free end of the passageway 6 is connected by the pipe 14 to the end 7 of the shaft 3 and it, in turn, is connected through the distribution block 15 and pipe 16 to a source of air or fluid pressure.

The flywheel 1 carries a bracket 17 bolted to its by the bolts 18. This bracket carries a plurality of inwardly extending clutch rings 19 which are prevented from rotating, because they are mounted upon the splined ribs 20. These rings are spaced from one another and interleaved between the clutch rings 21 that are slidably mounted upon the splines 22 of the sleeve 23 which is keyed by the key 24 to the shaft 3. This sleeve 23 has a vertically extending end abutment 24a forming a clutch ring engaging one of the rings of the flywheel ring system designated 19. Interposed between the rings 19, 21 and 24a are clutch face material rings 25.

There is also mounted upon the sleeve 23 a ring 26 that has an extension 27 with a right angle bracket 28, on which there is a brake ring 29 that engages through the brake material 30 with the depending stationary brake ring 31 which is carried upon the studs 32 that are, in turn, mounted upon a stationary portion of the press 33. The other side of this ring 31 is engaged by a flange 34 which is likewise mounted upon the sleeve 23 and is retained against movement by the threaded collar 35.

This flange 34 also forms the back of the cylinder 13, in which is mounted a piston 36, the righthand end of which is adapted to engage with the ring 26 to move it to the righthand to cause the clutch disks to engage. When it moves to the lefthand, the clutch disks can spring apart and the brake disks 29 and 31 can become operative against the abutment 34. This is brought about by the spring 37 tending to disengage the clutch and move the brake disks into braking engagement.

The spring 37 is mounted upon a bolt 38, one end of which is connected into the ring 26 and the other end of which is engaged with the end of the spring 37. The spring 37 is held between a nut 39 and the lefthand face of a plate 40 which is mounted upon the ring 34. This mounting of the spring is within a recess 41 which corresponds to the cylinder 12 so that there are provided one or more cylinders 13 and one or more springs 37 and bolts 38 so that the hydraulic or pneumatic cylinders and associated mechanism will cause clutching and the springs will cause braking.

By having these opposed media symmetrically disposed about the periphery of the mechanism, it is possible to secure uniform and very quick braking and clutching action. By removing the collar 35, the entire braking and clutching mechanism can be disassembled for inspection and repair. By making the braking surfaces of rings of greater diameter than the clutch rings, it is possible to get a greater braking area with fewer rings to thereby facilitate cooling. By placing the brake in the outer position and the clutch in the inner position, it is easy to cool the brake.

By having the cylinder within the brake and to one side of the clutch, it is possible to have a much larger cylinder and piston and to make it readily accessible, both for supplying of fluid pressure and for making the necessary adjustment and repairs. The clutch, on the other hand, has a series of smaller rings, but of greater number so that the total clutching area is greater.

In a typical installation of this mechanism, the following characteristics have been found practical and useful. In this typical installation, the brake disk had an outside diameter of 33″ and an inside diameter of 24″, and the three clutch disks each had an outside diameter of 10½″ and an inside diameter of 6″.

Clutch

Total area clutch cylinders—155 sq. in.
Pressure at 80 lbs.—12,400 lbs. less 2,940 lbs. brake springs=9,460 lbs.
Area of disk—233 sq. in.
Total area of disks—1,398 sq. in. (3 disk).
Pressure per sq. in. on disk—40.5 lbs.
Clutch torque—7,786 ft. lbs.

Brake

Pressure of brake springs—2,960 lbs.
Area of disk—403 sq. in.
Total area of disk—806 sq. in.
Pressure per sq. in. on disk—7.3 lbs.
Brake torque—2,795 ft. lbs.

Referring to the fluid supply, the fluid pressure enters the casing 15 through the passageway 16. This passageway communicates with a chamber 16a, in which rotates the pipe 14 that has a plurality of lateral ports 14a. The washers 42 seal this pipe so that, as the pipe rotates with the shaft 3, the fluid presure can nevertheless be constantly supplied.

It will be understood that I desire to comprehend within by invention such modifications as come within the scope of the claims and the invention.

Having thus fully described my invention, what I claim as new and desire to secure by Letters Patent is:

1. In combination, a shaft, a flywheel, a plurality of clutch rings mounted on said shaft and said flywheel adapted to engage one another, a plurality of braking rings of larger size than the clutch rings and partly mounted on said shaft and partly on a stationary support, a common fluid operated means for engaging the smaller clutch rings, and a common spring means for disengaging the clutch rings and engaging the larger brake rings, said brake rings being disposed exteriorly of said fluid operated means.

2. In combination, a shaft, a flywheel, a plurality of clutch rings mounted on said shaft and said flywheel adapted to engage one another, a plurality of braking rings of larger size than the clutch rings and partly mounted on said shaft and partly on a stationary support, a common fluid operated means for engaging the smaller clutch rings, and a common spring means for disengaging the clutch rings and engaging the larger brake rings, said brake rings being disposed exteriorly of said fluid operated means, said clutch rings being in greater number than said brake rings.

3. In combination, a shaft, a flywheel, a plurality of clutch rings mounted on said shaft and said flywheel adapted to engage one another, a plurality of braking rings of larger size than the clutch rings and partly mounted on said shaft and partly on a stationary support, a common fluid operated means for engaging the smaller clutch rings, and a common spring means for disengaging the clutch rings and engaging the larger brake rings, said clutch rings being in greater number than said brake rings, said fluid pressure means being located to one side of the clutch rings and inside of the brake rings.

4. In combination, a shaft, a flywheel mounted thereon having clutch rings, a sleeve on said shaft having interleaved clutch rings, fluid pressure means for causing said rings to engage, a plurality of brake rings partly stationary and partly mounted on said sleeve exteriorly of said fluid pressure means, and spring means adapted to cause said brake rings to engage, said fluid pressure means and spring means being symmetrically disposed with respect to said shaft within said brake rings.

5. In combination, a shaft, a flywheel mounted thereon having a plurality of inwardly disposed clutch rings, a sleeve on said shaft having a plurality of interleaved clutch rings, an abutment on said sleeve for resisting the movement of said rings in one direction, a cylinder and piston mounted on said sleeve for moving said rings against said abutment; a brake ring larger than said clutch rings and mounted on said sleeve and a stationary brake ring adapted to engage therewith, and a second abutment on said sleeve for resisting the movement of said brake rings toward one another, said brake rings being disposed exteriorly of said cylinder and piston.

6. In combination, a shaft having a passageway therethrough longitudinally and transversely, means for supplying fluid pressure to said shaft through the end thereof as it rotates, means to remove said fluid pressure from said shaft, a plurality of clutch disks supported by said shaft, a part of them turning with the shaft and a part of them turning freely with respect to the shaft, fluid pressure actuated means for causing said disks to engage comprising a cylinder connected to said pressure removing means and a piston therein, brake means comprising a disk transversely slidable and turning with said shaft, and a stationary disk so arranged that when said clutch means is engaged by said fluid pressure means said brake means is disengaged, said brake means being disposed exteriorly of said fluid pressure actuated means.

7. In combination, a shaft having a passageway therethrough longitudinally and transversely, means for supplying fluid pressure to said shaft through the end thereof as it rotates, means to remove pressure from said shaft, a plurality of clutch disks supported by said shaft, a part of them turning with the shaft and a part of them turning freely with respect to the shaft, fluid pressure actuated means for causing said disks to engage comprising a cylinder connected to said pressure removing means and a piston therein, brake means comprising a disk transversely slidable and turning with said shaft, and a stationary disk so arranged that said brake means is disengaged by said fluid pressure means, and yieldable means adapted to disengage said clutch means and engage such brake means, said brake means being disposed exteriorly of said fluid pressure actuated means.

8. In combination, a shaft, a flywheel on said shaft, a plurality of interiorly disposed spaced clutch disks carrried thereby, a plurality of interleaved clutch disks mounted on said shaft; and brake means connected with said clutch means of larger diameter than said clutch means; and stationary means for engaging with said brake means; and means for alternatively causing said clutch means to be engaged and said brake means to be disengaged and causing said clutch means to be disengaged and said brake means to be engaged; said brake means and said stationary means being arranged exteriorly of said last-mentioned means.

REUBEN E. WISSMAN.